United States Patent [19]

Porter

[11] 4,411,339

[45] Oct. 25, 1983

[54] FRICTION LOCK MECHANISMS

[75] Inventor: Clyde R. Porter, Los Angeles, Calif.

[73] Assignee: P. L. Porter Co., Woodland Hills, Calif.

[21] Appl. No.: 416,637

[22] Filed: Sep. 10, 1982

Related U.S. Application Data

[63] Continuation of Ser. No. 157,458, Jun. 6, 1980, abandoned.

[51] Int. Cl.³ .............................................. B65H 59/10
[52] U.S. Cl. ................................... 188/67; 188/77 W
[58] Field of Search .............. 188/67, 77 W, 265, 285, 188/196; 192/81 R, 81 C, 114 R; 74/531; 297/375; 267/155

[56] References Cited

U.S. PATENT DOCUMENTS

| | | | |
|---|---|---|---|
| 2,393,242 | 1/1946 | Flogans | 188/67 X |
| 2,750,994 | 6/1956 | Howell, Jr. | 297/375 |
| 3,249,180 | 5/1966 | Torossian | 192/81 R X |
| 3,874,480 | 4/1975 | Porter et al. | 297/375 X |
| 3,998,302 | 12/1976 | Schupner | 188/285 |
| 4,099,777 | 7/1978 | Chekirda | 297/375 |

Primary Examiner—Douglas C. Butler
Attorney, Agent, or Firm—Beehler, Pavitt, Siegemund, Jagger & Martella

[57] ABSTRACT

A mechanical lock normally preventing axial motion of a rod with respect to a housing sleeve that surrounds the rod includes a coil spring whose diameter is slightly less than the diameter of the rod so that the coil spring normally encircles and grips the rod tightly. The coil spring is mounted on the rod between a bushing fixed to the housing sleeve at one end of the spring and a second bushing that is rotatable with respect to the housing at the other end of the spring. The rotary bushing is rotated by an actuating lever to unwind the spring so as to increase its diameter and thereby to release its grip on the rod. Both the fixed bushing and the rotatable bushing include beveled faces which permit the last few turns at both ends of the spring to become cocked on the rod to provide a true locking engagement with the rod. The last few turns of the spring adjacent the rotatable bushing are immediately released by a minimum of rotation of the bushing since it is not necessary for the unwinding of the spring to be transmitted through the entire length of the spring. Because the spring is shorter than in prior locks, the entire device is shorter and accordingly more resistant to bending and lighter in weight. The structure of the device simplifies its assembly and this, along with its reduced length appreciably reduces the cost of producing the device.

2 Claims, 2 Drawing Figures

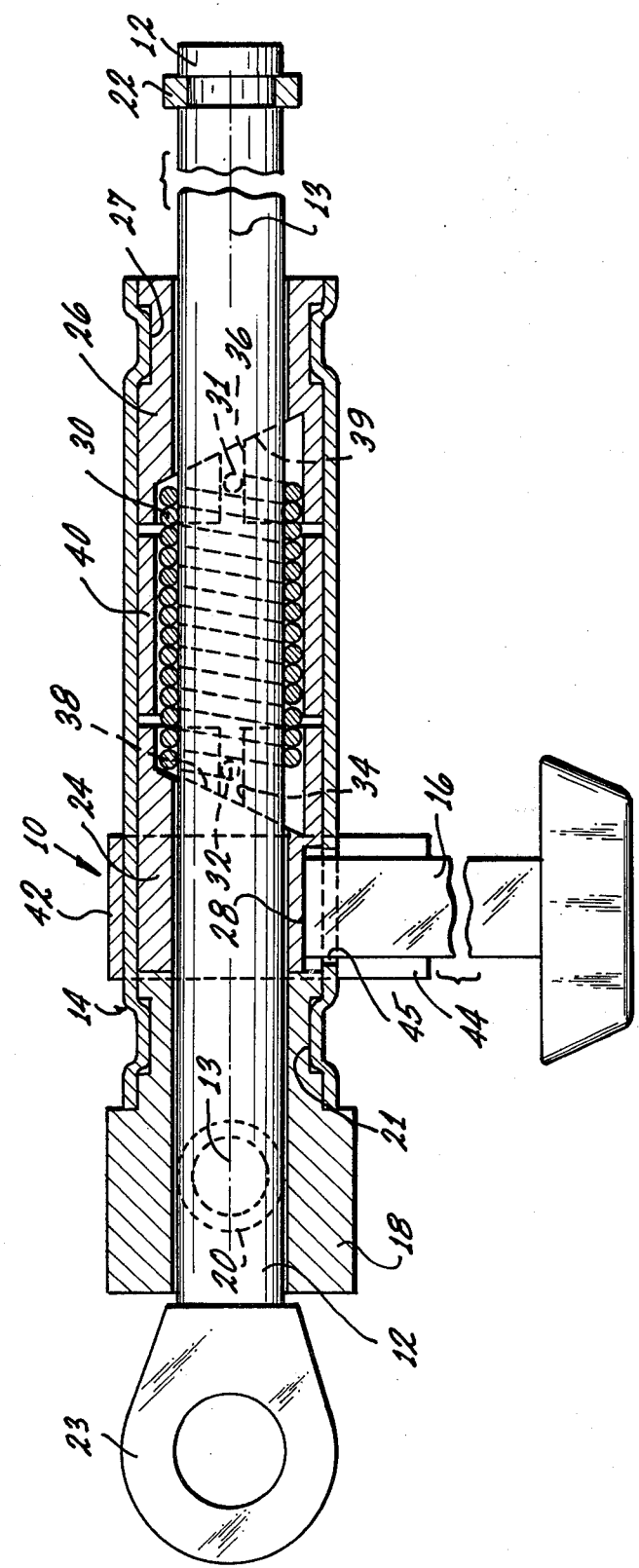

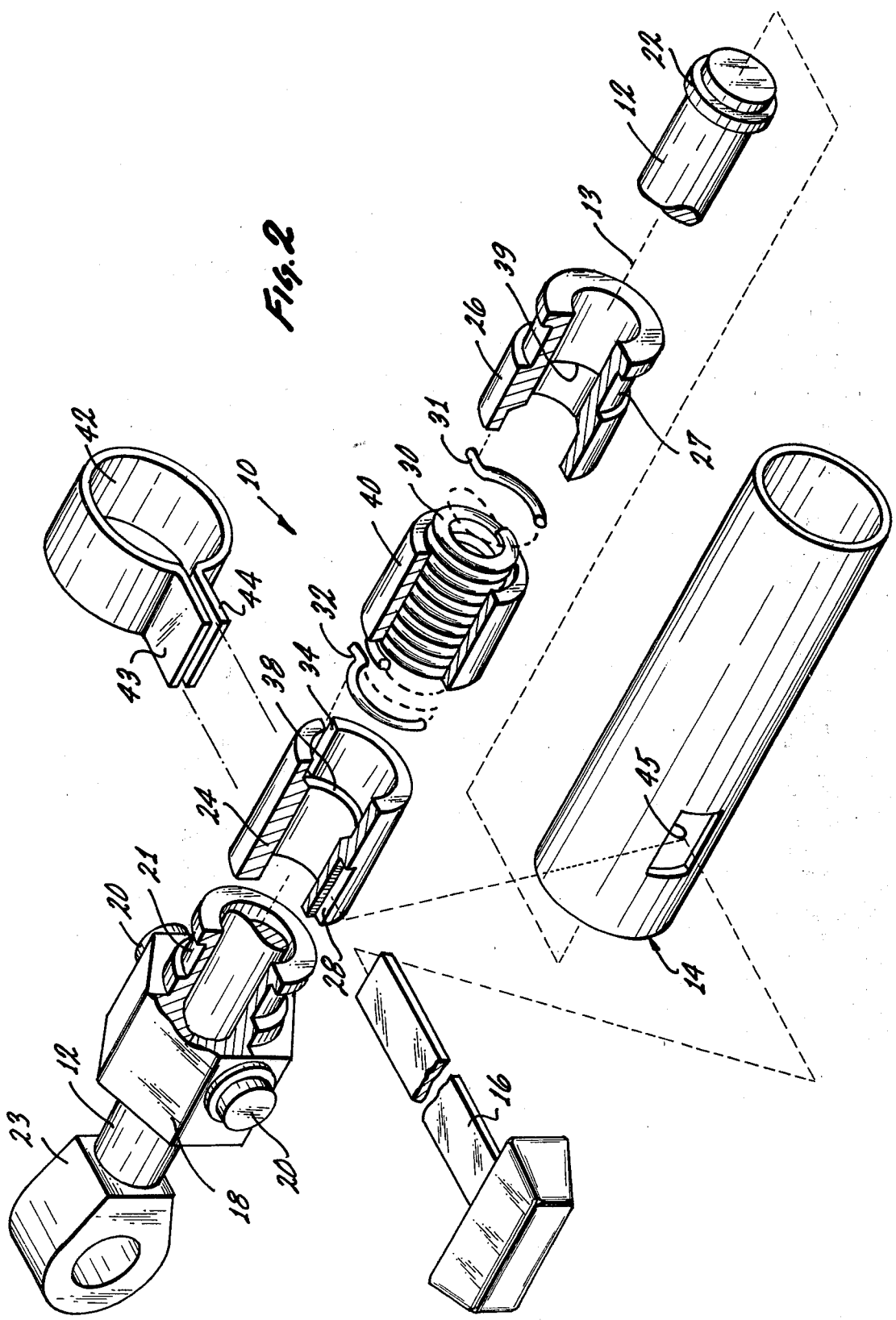

FRICTION LOCK MECHANISMS

This is a continuation, of application Ser. No. 157,458, filed June 6, 1980 now abandoned.

BACKGROUND OF THE INVENTION

1. Field of the Invention

The present invention is in the field of mechanical locking devices and specifically relates to a device of the type in which the locking is effected by a coiled spring which grips a rod, for clamping the rod against translational motion relative to a housing and for selectively enabling such motion.

2. The Prior Art

Friction brake locking devices are known in which a rod extends into a cylindrical housing. Normally, the rod is locked with respect to the housing so that axial translational motion of the rod relative to the housing is prevented. However, the device can be selectively actuated to an unlocked state in which such motion is enabled. A coiled spring is affixed to the housing and is coaxial with the rod in the locked state. The spring grips the curved surface of the rod to prevent the rod from moving with respect to the housing. An actuation lever permits an operator to partially unwind the spring, thereby increasing its inside diameter so that the spring no longer grips the rod, which may then be moved freely axially within the coiled spring.

The use of a coiled spring to grip a rod extending coaxially through the spring is well known. A number of locking devices making use of this basic principle are known in the art.

Among the prior art devices is the locking device of U.S. Pat. No. 3,249,180 issued May 3, 1966 to Torossian. As shown in FIG. 10 of the Torossian patent, the spring is affixed at one end to a fixed ring 109, while the other end of the spring 108 is engaged by a rotatable ring 110. The ring 110 engages a longitudinally-extending groove in the rod, so that when the rod is rotated, the ring also rotates to tighten the grip of the spring on the rod.

The device of the Torossian patent includes an abutment on the rotating ring and on the fixed ring to cause the spring to become cocked on the rod, in which state the gripping force of the spring on the rod increases with the axial load, thereby resulting in a true locking action. This aspect of the mechanics of the device was also recognized by Howell in U.S. Pat. No. 2,750,994 issued June 19, 1956. However, as shown most clearly in FIG. 5 of the Howell patent, in his device, only the fixed sleeve 25 is provided with a beveled base 40, and the device is actuated by rotating the opposite end 31 of the spring. Accordingly, in Howell'device, it is necessary to unwind the many turns of the spring to transmit the enlargement of the diameter to the fixed end of the spring. This necessitates an unnecessarily long stroke for the actuating lever.

Another type of prior art device is that shown in U.S. Pat. No. 3,874,480 issued Apr. 1, 1975 to Porter, et al. As can best be seen in FIG. 2 of the Porter, et al. patent, two springs are disposed co-axially to extend in opposite directions from a central actuating lever to fixed locking bushings located at opposite ends of a housing sleeve. One of the locking bushings locks the device in tension and the other locks it in compression. The interaction of the last two or three coils at the ends of the springs distal to the actuating lever with the locking bushings is responsible for the locking effect.

It is noteworthy that while only one of the springs in the Porter, et al. device is effective at a particular instant to oppose tension or compression, unlocking of the device nonetheless requires unwinding both springs simultaneously by use of the actuating lever. The lever must be moved through a sufficient stroke that the entire length of each spring is unwound, to ensure that the last two or three turns will be unwound. This necessitates a large actuating lever stroke which is opposed by the combined forces of both springs resisting unwinding. Consequently, in contrast to the present invention both the actuating lever stroke and the force needed for its operation are relatively large. While such structure functions well, there are installations where, due to space limitations and the like, there is a need for a friction brake type of device in which the stroke of the actuating lever is comparatively small and which operates at a comparatively smaller force.

The structure of the Porter, et al. device, while satisfactory in performance, is somewhat complicated because of the assembly of the device. The end bushings which affixed the distal ends of the springs to the housing sleeve had to be rotated during the assembly process to positions in which the proximal ends of both of the springs abutted the actuating lever in a balanced manner. Such rotation necessitated that the grip of at least one of the springs be released by unwinding that spring. In practice, assembly required a highly-skilled wind-up operation to assure that both springs were properly compacted and twisted against the actuating lever. In contrast, in the present invention this complicated assembly procedure is not required.

The following patents can be distinguished from the present invention on the basis that they do not include an abutment or beveled bushing against which the spring bears, and accordingly the true locking action discussed above is not employed. These patents include U.S. Pat. No. 2,434,480 to Anderson, issued Jan. 13, 1948; U.S. Pat. No. 3,320,595 to Kedem; U.S. Pat. No. 2,429,383 to Arens, and U.S. Pat. No. 3,064,766 to Hanizeski.

There are instances in which it is desirable to have a mechanical locking device in which the force needed to release the lock mechanism is reduced while also reducing the amount of movement of the actuating lever to effect release. A typical such application is in the automotive seat field in which movement of the seat back between an upright and reclining position should be accomplished smoothly and without a snap type action. Further, where the locking mechanism is of the direct control actuation type, i.e. the user manipulates a release lever, in contrast to some type of linkage mechanism of the remote control type, large forces for release or large movements of the actuating lever should be avoided.

While the above may be accomplished, one of the practical considerations is to accomplish these objectives with a relatively inexpensive device, but one which is capable of functioning properly over an extended period of time. Further, the device should be essentially maintenance free and capable of functioning over extreme temperature ranges and not adversely affected by water, dirt, dust and the like.

SUMMARY OF THE INVENTION

In accordance with the present invention, the abovedescribed disadvantages of the prior art mechnaical locks are overcome by the improved structure to be described and which represents a preferred form of the invention. This structure of the invention includes only a single spring instead of the two springs used in the Porter, et al. patent, thereby immediately reducing the actuating force by half.

In accordance with the present invention, a stationary locking bushing is provided at one end of the single spring and a rotatable locking bushing is provided at the other end of the spring. The spring interacts with these locking bushings to prevent motion of the rod in either axial direction. The rotatable locking bushing is turned by an actuating lever, and since the last two or three coils of the spring that are effective for locking the rod in one direction are adjacent the rotatable locking bushing, it is not necessary to unwind the entire spring to release the grip of those coils. Thus, the release action is smooth because the balance of the spring tends to act as a drag thereby avoiding a snap release action and the sudden motion which normally accompanies a snap action release. Accordingly, these coils can be released by only a short stroke of the actuating lever. Thus, the present invention makes possible a mechanical lock that requires less force and less stroke to release while assuring a smooth release. These features make practical the use of a direct control actuation push-button type of control for operating the actuating lever. The use of a bush-botton control is very desirable from an aesthetic or styling standpoint.

A further feature is the location of the actuating lever in a position other than in the area of the spring. The opening through which the lever extends is covered to prevent intrusion of dirt, soap or cleaning solutions, especially in the area of the locking zone between the few coils of the spring and the rod. The interior of the device is packed with a high temperature range grease of the aircraft or automotive type, and is with a type which does not flow at high temperature.

Less apparent, but also important, is the simplification of the assembly process that results from the structure of the present invention. Unlike the mechanical lock described in the Porter, et al. patent, the parts of the present invention can be assembled along the rod, inserted into the housing sleeve, and then affixed to the housing sleeve by swaging the fixed locking bushing inside the sleeve.

Because the spring in the present invention is shorter than the springs used in the device described in the Porter, et al. patent, the entire mechanical lock is shorter. The length-to-diameter ratio is correspondingly less, and this improves the ability of the device to resist bending while allowing higher unit loading because of the shorter column length.

Because the entire mechanical lock is shorter and because its assembly procedure is simpler, the mechanical lock of the present invention can be produced at a cost that is approximately half that of the prior art mechanical lock. The mechanical lock of the present invention is appreciably lighter in weight than the prior art lock, which makes the lock of the present invention better suited for aircraft and automotive use.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a view, partly in section and partly in elevation, showing a preferred embodiment of the mechanical lock of the present invention; and, FIG. 2 is an exploded view, with some parts in section, of the mechanical lock shown in FIG. 1.

DETAILED DESCRIPTION OF THE PREFERRED EMBODIMENT

Turning now to the drawings in which there is shown a preferred embodiment of the present invention, it can be seen that the mechanical lock 10 includes a cylindrical rod 12 which is selectively slideable along an axis 13 within and relative to a housing 14 which may be tubular as shown.

Normally the rod 12 is locked at a fixed position axially with respect to the housing 14, and this relationship is interrupted only when an operator moves an actuating lever 16 to unlock the device to permit the rod 12 to be shifted axially to a new position with respect to the housing 14.

The mechanical friction lock 10 shown in the drawings may be used in positioning the back of a seat, of the reclining type commonly used in passenger airplanes, railroad coaches and automobiles. The mechanical lock is provided with a mounting 18 and a trunnion 20 for use in attaching the mechanical lock to certain portions of the seat. The portion of the mounting received within one end of the housing 14 includes a groove 21 which is used to swage the housing to the mounting, as shown. A stop 22 provides a positive limit to the amount of motion of the rod 12 with respect to the housing 14, the other end of the rod may include an eye 23 or any other form of device for attachment to a cooperating component of the seat.

Located axially of the rod, within the housing and adjacent to the mounting 18 is a rotatable bushing 24 while at the other end of the housing is a second bushing 26 which includes a groove 27, similar to 21, used to swage the housing 14 to the fixed bushing 26. Rotatable bushing 24 may include a groove 28 provided along the outer periphery to receive the end of the lever as shown.

Surrounding a portion of the rod and located between the rotatable and fixed bushings 24 and 26, respectively, is a helical coil spring 30, each end of which includes a radially extending tang 31 and 32. Bushing 24 includes an axial 34 slot to receive tang 32 while fixed bushing 26 includes an axial slot 36 to receive the other tang 31. Thus, one end of the spring is fixed against rotation while the other end may be rotated.

In the normal at-rest seat position of the lever 16, the spring 30 is in frictional engagement with the periphery with the rod 12 to lock the rod in a fixed position axially with the housing 14. Upon movement of the actuating lever 16, the rotatable bushing is rotated and the spring 30 is unwound causing it to release its grip on the rod 12. Depending upon the direction in which the spring 30 is wound, release movement of the lever 16 may be up or down, as viewed in the drawings, to rotate bushing 24 in one or the other direction to effect release of the rod 12. When released, the lever 16 returns automatically to the locked position and the spring frictionally engaged the periphery of the rod 14.

The rotating bushing 24 includes a beveled face 38, and the fixed bushing 26 includes a beveled face 39. These beveled faces cause the last few coils at the ends of the spring 30 to become cocked against the rod 12 thereby locking it with a true locking action in tension and compression respectively. The locking engagement referred to herein is is a type of interaction in which the application of increased force results in the parts becoming more securely locked together.

A sleeve 40 may surround the spring 30 to insure that as the spring is unwound by motion of the rotatable bushing 24 the slack of the spring will be transmitted to the end of the spring held by the fixed bushing 26 rather than being accumulated in the turns nearest the rotatable bushing 24. While the form illustrated includes a sleeve 40, one variant which may be used is to increase the axial length of each of the bushings 24 and 26 so that the respective inboard ends or skirts of the bushings meet. In this way the sleeve 40 is not needed since the extended bushings now perform the function of that sleeve. One advantage of this variant is that better bend resistance is provided along the axis of the housing.

In the form illustrated, a collar 42 with two spaced fingers 43 and 44 fits over the housing 14. The fingers 43 and 44 may be affixed to the lever 16, as by welding or the like, so that as the lever is actuated, the collar 42 rotates relative to the housing 14.

The housing 14 includes a window 45 through which the lever 16 extends into slot 28 of bushing 24. Since the collar 42 moves with the lever, it functions as a cover for the window to prevent dust and other foreign materials from entering the housing through window 45.

As mentioned earlier, the inside of the housing between the end mounting 18 and bushing 26 is packed with lubricant such as a high temperature stable grease which will not flow at elevated temperatures. This, one function of the collar 42 is to assist keeping the grease within the housing.

It will also be noted that the window 45 is located in alignment with the slot 28 of the bushing 24, rather than in an area opening into the spring region. As a practical matter is is quite difficult for foreign matter to enter the housing through the window and to move between the outer periphery of bushing 24 and the facing inside wall of the housing into the locking region of the spring. This has definite practical advantages over prior art structure, especially for locking devices used in the automotive field.

In operation, only a relatively small amount of movement of the lever 16 is needed in order to effect release of the rod 12, as is apparent from the relatively small circumferential size of the window 45. Further, since one spring is used, fixed at one end and moveable at the other, the amount of force needed is reduced. The reduction in force is also attributable to the fact that the effective locking coils of the spring 30 are those first 2 or 3 coils adjacent to the rotating bushing 24. To achieve this type of locking, the bushings include the angular faces 38 and 39 which produce the action described. The result is that there tends to be an immediate and progressive release by a small amount of rotation of the bushing 24, i.e. it is not necessary to transmit the motion throughout the entire length of the spring 30. The action is that of a gradual type release as the first few coils of the spring unwind, with the balance of the spring acting as a drag for smooth release of the rod 12. In practical terms, the elimination of the initial, snap quick release, with the resulting sudden motion, is of definite advantage.

The structure of the present invention as shown in the drawings simplifies the assembly of the mechanical lock. The fixed bushing 26, the rotatable bushing 24, the spring 30, the sleeve 40, and finally, the fixed bushing are slid onto the rod in succession, the rotatable bushing 24 and the fixed bushing 26 being rotated until the tangs 21, 32 of the spring 30 enter the slots 36, 34. Thereafter, the housing 14 is slid over the other parts on the rod and swaged to the end mounting 18 and the fixed bushing 26. Thereafter, the actuator 16, and the stop 22 and collar 42 are affixed to the mechanism. During the assembly, grease is also introduced into the assembly, but prior to the assembly of the collar.

Thus, there has been described a mechanical friction lock having a structure which permits the lock to be unlocked by use of an actuating lever in which the stroke and the actuating force are significantly reduced in comparison with mechanical locks of the prior art. The device uses a rotatable locking bushing that is turned by the actuating lever and because the two or three coils of the spring that are effective for locking the rod in one direction are adjacent the rotatable locking bushing, it is not necessary to unwind the entire spring to release the grip of those coils to permit motion in that direction. The reduced stroke and actuating force of the mechanical lock of the present invention make practical the use of a direct control push-button actuation for operating the lever. The use of a push-button control is very desirable from a styling standpoint. The assembly process is simplified by the structure of the lock of the present invention, and this, along with the reduced length of the devices makes it possible to manufacture the present invention at a cost approximately half that of prior art devices. Further, the advantageous length-to-diameter ratio of the present invention enhances the ability of the device to resist bending. Because the mechanical lock of the present invention is appreciably lighter in weight than prior art locks, it is better suited for aircraft and automotive use.

The foregoing detailed description is illustrative of one embodiment of the invention, and it is to be understood that additional embodiments thereof will be obvious to those skilled in the art. The embodiments described herein together with those additional embodiments are considered to be within the scope of invention.

What is claimed is:

1. As an article of manufacture, an infinitely positionable mechanical friction lock comprising:
    a housing having a non-rotatable rod positioned therein for axial movement in either direction with respect thereto;
    a fixed bushing including an annular inclined cam surface at one end of said housing through which said rod extends;
    a rotatable bushing including an inner annular inclined cam surface;
    a single coil spring positioned on said rod and located between said bushings and normally operative to grip said rod to prevent axial movement thereof in either direction relative to said housing;
    said fixed bushing and said rotatable bushing cooperating with said spring such that one of said bushings and the adjacent portion of the spring locks said rod in compression and the other of said bushings and the adjacent portion of the spring locks said rod in tension;

release means to effect rotation of said rotatable bushing whereby said coil spring is released from said rod by unwinding the coils of the spring adjacent the rotatable bushing to permit movement of the latter in either axial direction relative to said housing; and means surrounding said spring such that as the spring is unwound to release said rod the slack of the spring will be transmitted to the end held by the fixed bushing rather than being accumulated in the turns nearest the rotatable bushing.

2. The mechanical lock of claim 1 wherein said housing includes window means in alignment with said release member;

operator means extending through said window and operative to effect rotation of said release member and to uncoil the last few turns of said spring adjacent to said release member to permit movement of said rod in either axial direction relative to said spring; and collar means positioned over said housing and covering said window in all positions of said operation means.

* * * * *